(12) United States Patent  (10) Patent No.: US 7,777,856 B2
Silverbrook  (45) Date of Patent:  Aug. 17, 2010

(54) FLEXIBLE ELECTRICAL DISPLAY

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 294 days.

(21) Appl. No.: 11/483,061

(22) Filed: Jul. 10, 2006

(65) Prior Publication Data

US 2006/0249586 A1  Nov. 9, 2006

Related U.S. Application Data

(63) Continuation of application No. 10/502,577, filed as application No. PCT/AU02/01170 on Aug. 29, 2002, now Pat. No. 7,128,269, which is a continuation of application No. 10/066,621, filed on Feb. 6, 2002, now Pat. No. 6,688,528.

(51) Int. Cl.
   *G02F 1/1345*  (2006.01)

(52) U.S. Cl. .................. 349/150; 349/149; 349/151; 349/152

(58) Field of Classification Search .................. 349/150
   See application file for complete search history.

(56) References Cited

U.S. PATENT DOCUMENTS

| | | | | |
|---|---|---|---|---|
| 5,341,233 A | * | 8/1994 | Tomoike et al. ............. | 349/150 |
| 5,436,744 A | * | 7/1995 | Arledge et al. ............. | 349/150 |
| 5,825,947 A | | 10/1998 | Sasaki et al. | |
| 5,923,080 A | | 7/1999 | Chun | |
| 6,016,176 A | * | 1/2000 | Kim et al. ..................... | 349/84 |
| 6,057,814 A | * | 5/2000 | Kalt ............................. | 345/58 |
| 6,107,988 A | | 8/2000 | Phillipps | |
| 6,182,901 B1 | | 2/2001 | Hecht et al. | |
| 6,204,902 B1 | | 3/2001 | Kim et al. | |
| 6,597,416 B1 | * | 7/2003 | Momose ...................... | 349/60 |
| 6,688,528 B2 | | 2/2004 | Silverbrook | |
| 6,886,751 B2 | | 5/2005 | Silverbrook | |
| 2001/0009299 A1 | | 7/2001 | Saito | |

FOREIGN PATENT DOCUMENTS

| | | |
|---|---|---|
| DE | 19939106 | 4/2001 |
| EP | 1001304 A2 | 5/2000 |
| EP | 1039788 | 9/2000 |
| JP | 01-148587 | 8/1989 |
| JP | 04-080720 | 3/1992 |
| JP | 2000-227767 | 8/2000 |
| WO | WO 99/00877 | 1/1999 |

OTHER PUBLICATIONS

Ohyama, S., Optical Sheet Memory System, Electronics and Communications in Japan, Part 2, vol. 75, No. 4, 1992.

* cited by examiner

*Primary Examiner*—Uyen-Chau N Le
*Assistant Examiner*—Chad H Smith

(57) ABSTRACT

An electrical display includes a flexible LCD screen capable of folding without creasing about a central spine region and having column and row electrodes. Circuit boards are coupled to the row and column electrodes. Tape automated bonding (TAB) strips are connected to the circuit boards. Electrical conductors are interposed between the TAB strips and the electrodes so that the TAB strips and electrical conductors serve to couple the circuit boards and the electrodes. The electrical conductors are dimensioned to accommodate folding of the screen.

7 Claims, 4 Drawing Sheets

FLEXIBLE ELECTRICAL DISPLAY

CROSS REFERENCE TO RELATED APPLICATION

This Application is continuation of U.S. patent application Ser. No. 10/502,577 filed on Jul. 28, 2004, now issued U.S. Pat. No. 7,128,269, which is a 371 of PCT/AU02/01170 filed on Aug. 29, 2002, which is a continuation of Ser. No. 10/066,621 filed on Feb. 6, 2002, now issued as U.S. Pat. No. 6,688,528, all of which is herein incorporated by reference.

FIELD OF THE INVENTION

The present invention relates to a compact display assembly. In a particular embodiment the invention relates to a display assembly incorporating a liquid crystal display (LCD) though other displays, such as an organic light emitting diode (OLED) display might also be used.

DESCRIPTION OF RELATED ART

It is now possible to obtain LCD devices having substrates made of a flexible plate, for example a plastic film. Such devices may be mounted on non-planar surfaces. One such LCD is described in U.S. Pat. No. 4,674,840 to Bennett. More recently, another flexible LCD device has been described in U.S. Pat. No. 6,204,902 to Kim et al.

Considerable research is presently being undertaken in relation to the development of OLED displays. OLED displays are made according to a multi-layer process by which an extremely thin polymer layer is sandwiched between two electrodes. A few layers of atoms from an indium-tin-oxide (ITO) transparent electric conductor are sputtered on transparent, flexible carrier films to form an anode. The anode is spin-coated with a very thin layer of electroluminiscent polymers. Centrifugal forces distribute the polymers, liquefied by solvents, in an absolutely uniform manner. In a final step a mechanically flexible cathode, being a combination of various metals, is sputtered on the component. The final product is flexible and less than 500 nm in thickness.

The manufacture of a display assembly which incorporates a flexible display poses a number of problems. One problem is that while the displays are flexible they will be damaged or their operation will be impaired if they are creased. Another difficulty is that although the display is flexible the associated driving circuitry is most readily mounted on rigid printed circuit boards. Accordingly a number of connections must be made between a flexible display and one or more rigid circuit boards which presents difficulties.

BRIEF SUMMARY OF THE INVENTION

It is an object of the present invention to provide a display assembly which incorporates a flexible display and which is arranged so that the display may be folded or curved over on itself without creasing.

According to the present invention there is provided a display assembly including:
a flexible display screen having a plurality of connection points;
at least two printed circuit boards located at the rear of said screen and defining a longitudinal region of the screen therebetween; and
flexible connectors between connection points located in said region and each of the printed circuit boards;
wherein the flexible connectors are of sufficient length to accommodate closing of the assembly about the longitudinal region.

The flexible connectors may comprise looms of wires.

It is preferred that the printed circuit boards connect to the looms of wires by means of tape automated bonding films.

Typically the screen will be rectangular in shape with an edge of the screen and edges of the PCBs defining triangles and the flexible connectors terminating along edges of the triangles.

Preferably said edge of the screen and edges of the PCBs define right triangles with the flexible connectors terminating along hypotenuses of the triangles.

Preferably the printed circuit boards are shaped so that the sum of the lengths of the hypotenuses is equal to said length of the display screen.

The flexible connectors may terminate along edges of the printed circuit board defining the longitudinal region of the screen.

In a preferred embodiment the screen comprises a flexible liquid crystal display.

Alternatively the screen may comprise an organic light emitting diode display.

The display assembly may be incorporated into a computational device, for example a laptop computer or electronic book.

DETAILED DESCRIPTION OF THE PREFERRED EMBODIMENT

In order that members of the public may understand how the present invention may be put into practice a preferred embodiment of the invention will now be described.

Figure 1:
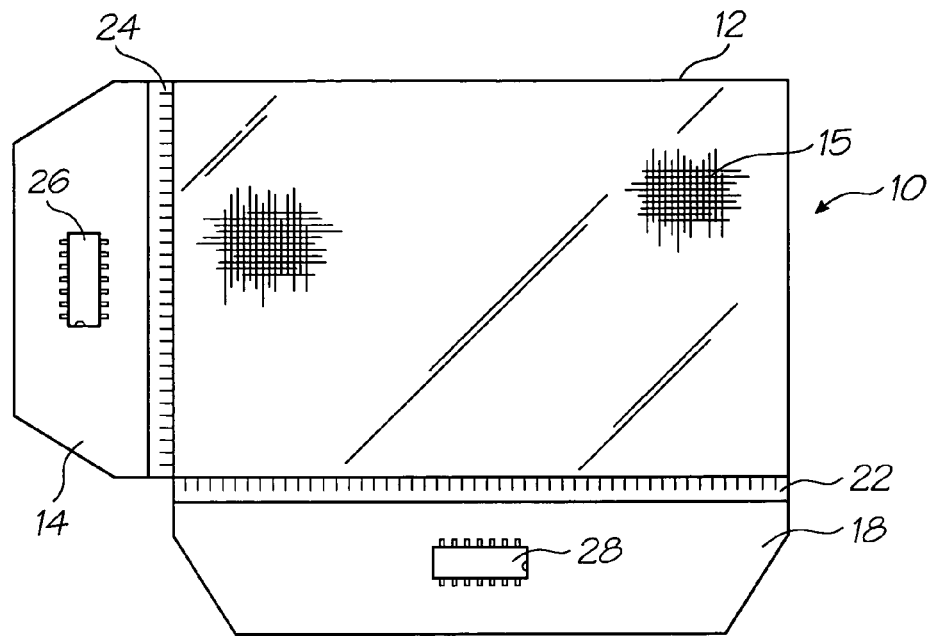
FIG. 1 is plan view of the front of a prior art display assembly.

A schematic view of a typical prior art passive matrix display assembly 10 is shown in FIG. 1. The liquid crystal display 12 is designed to display dot pattern images. A plurality of row and column electrodes is horizontally and vertically disposed across the liquid crystal display. Connection points for the electrodes are located along edges of the liquid crystal display.

Figure 2:
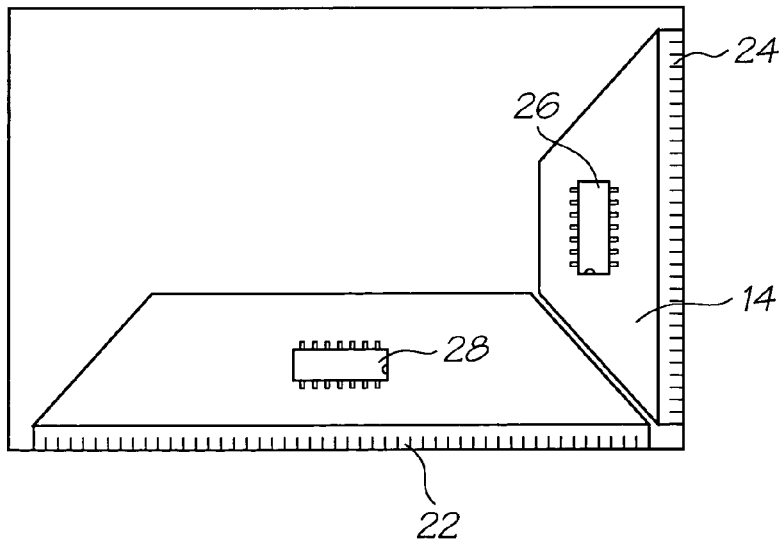
FIG. 2 is a plan view of the rear of a prior art display assembly.

Circuit boards 14 and 18 are coupled to the row and column electrodes of the LCD by means of tape automated bonding (TAB) films 22 and 24. PCB's 14 and 18 support circuitry including a row driver chip and column driver chip, 26 and 28 respectively, for applying potentials to selected row and column electrodes in order to selectively activate liquid crystal cells to form a display. For mounting in an apparatus such as a laptop computer or mobile phone the printed circuit boards 18 and 14 may be folded back behind the screen as shown in FIG. 2 which is a rear view of the display assembly. It will be realized that flexing of the LCD 12 would place a strain on the TAB connections 22, 24 to each of PCBs 14 and 18.

Figure 3:
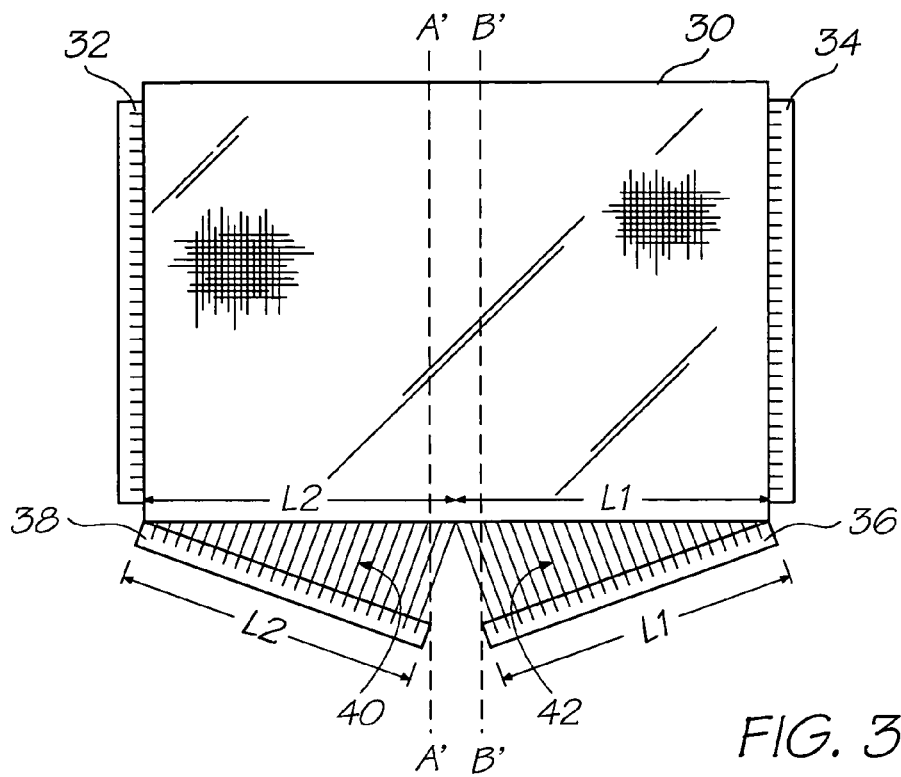
FIG. 3 is a plan view of the front of a display.

A preferred embodiment of the present invention will now be described with reference to FIG. 3. FIG. 3 depicts a flexible LCD screen 30 including TAB connections 32 and 34 for connecting to display row electrodes.

Beneath the lower edges of the flexible LCD 30 there are located two angled TAB strips 36 and 38. Connection points on each of the angled TAB strips are connected to column electrodes of the LCD display by means of flexible wire looms 40 and 42 respectively. It may be noted that in the presently described embodiment, the distance L1 along the TAB strip 36 is equal to the distance L1 along the column electrodes to which it is connected by wire loom 42. Accordingly the distance between the column electrodes is maintained as the distance between contacts on the TAB strip which may be desirable in some circumstances. The arrangement is identical in respect of the left hand TAB strip 38 which has a length L2=L1.

Figure 4:
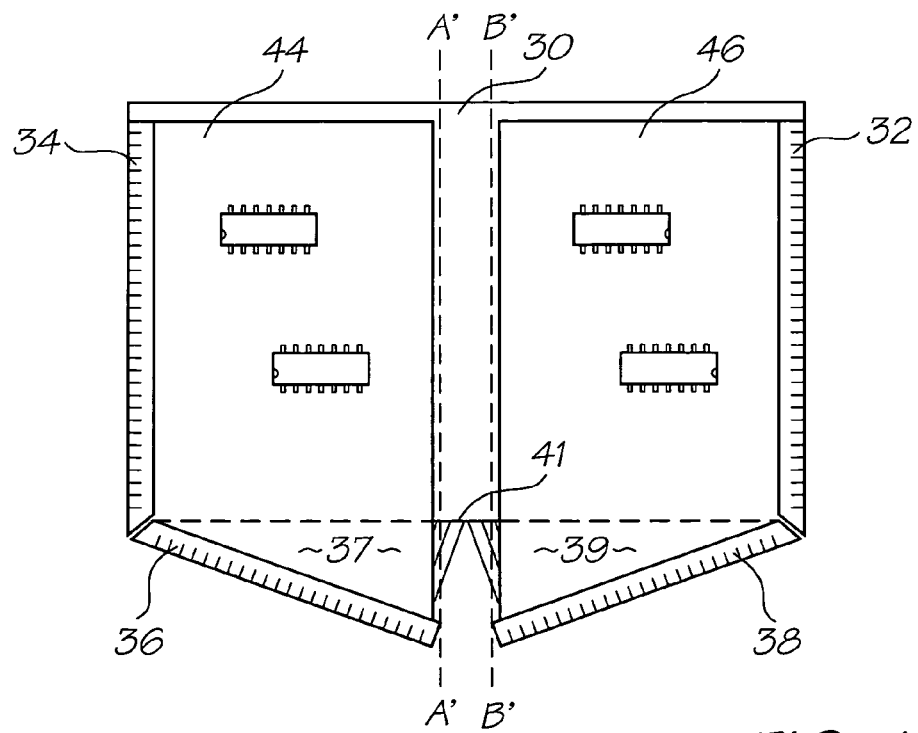
FIG. 4 is a plan view of the rear of a display assembly according to an embodiment of the present invention.

FIG. 4 shows a rear view of the display of FIG. 3 with PCBs 44 and 46 attached to the folded over TAB strips 32-38. It will be noted that there is sufficient width in the longitudinal region of the screen, defined by edges A-A' and B-B', of the PCBs for the display to be curved or folded on itself without creasing. The bottom edge 41 of screen 30 along with edge A-A' of PCB 46 and TAB film 38 define a right triangle 39. Similarly triangle 37 is defined by edge B-B' of PCB 44 and TAB film 36.

Figure 5:
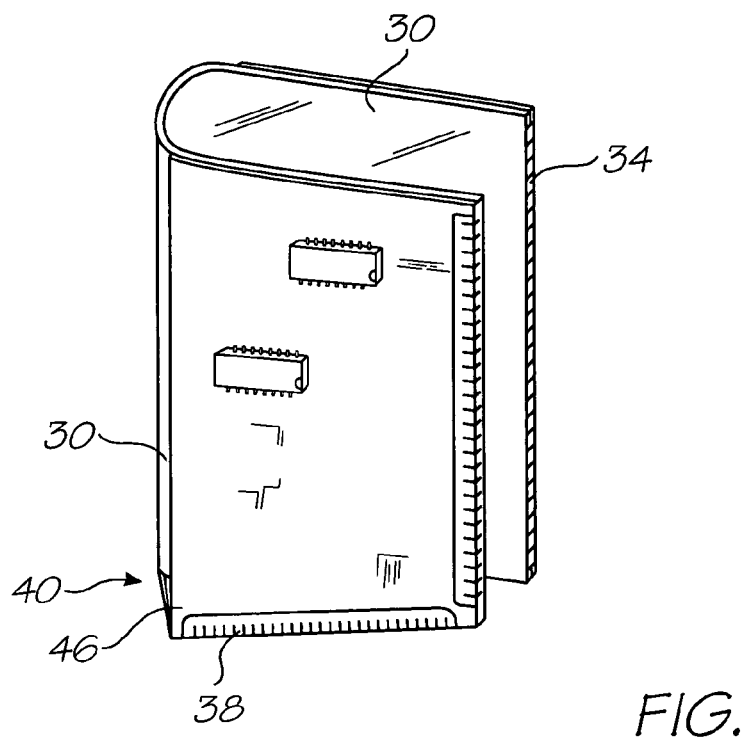
FIG. 5 is a perspective view of an assembly according to an embodiment of the present invention in a compact configuration.
Figure 6:
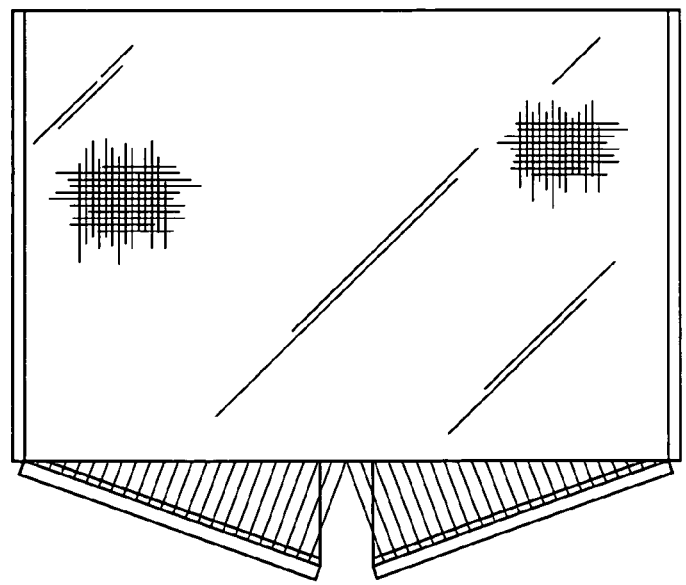
FIG. 6 is a plan view of an assembly according to an embodiment of the present invention in a display configuration.

The display assembly is shown curved upon itself to a compact configuration in FIG. 5. Upon folding the screen as shown in FIG. 5 the wires connecting column electrode connection points in the region between lines A-A' and B-B' (FIG. 3) to TAB strips 36 and 38 tighten. Accordingly a degree of slack must be present in those wires of looms 40 and 42 when the assembly is in an open configuration as shown in FIG. 6.

Computational devices such as laptop computers, electronic books and the like may be designed with a hinged or otherwise folding housing to incorporate the display assembly thereby facilitating formation of a compact device.

Figure 7:
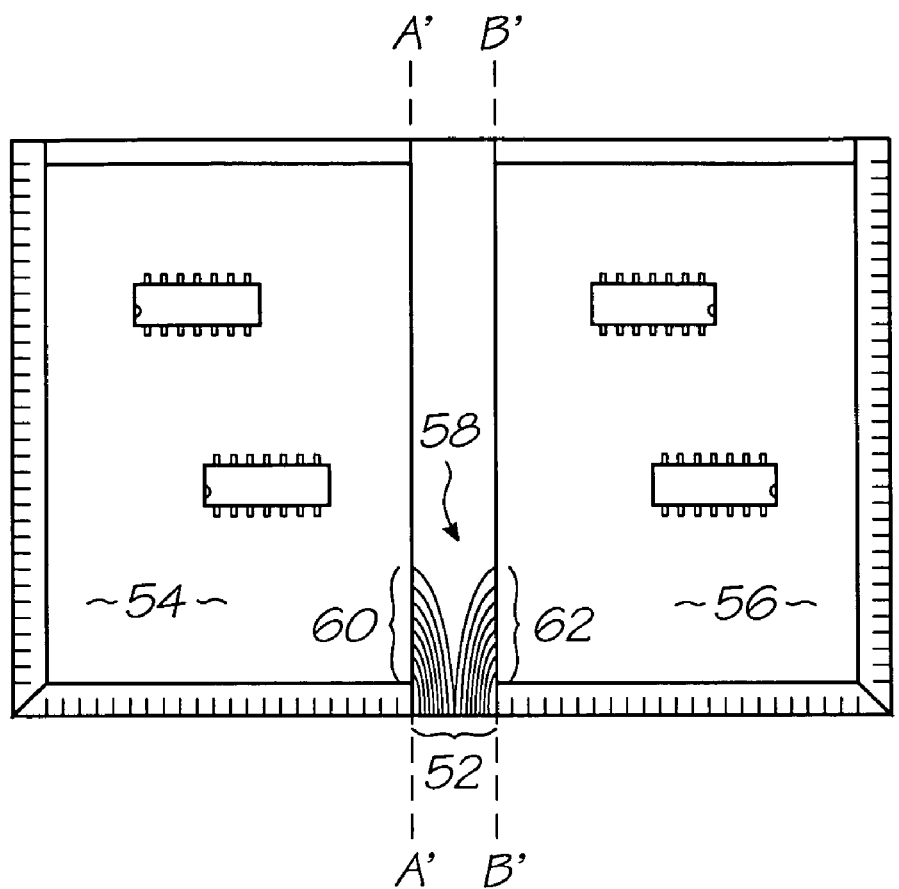
FIG. 7 is a plan view of the rear of a display assembly according to a further embodiment of the present invention in a compact configuration.

A further embodiment of the invention is depicted in FIG. 7. FIG. 7 shows the rear of a display assembly in which the PCBs 54 and 56 do not project from the bottom of the screen. Rather column electrode connection points 52 in the region between A-A' and B-B' are connected to connection points 60 and 62 on the inner edges of PCBs 54 and 56 by flexible connectors 58.

Variations of the invention other than the embodiments that have been described with reference to FIGS. 3-7 are of course possible. For example other types of flexible display screen may be used such as an organic light emitting diode screen. Furthermore, the connection between the electrode contacts and the angled TAB films 38, 36 (FIG. 4) might be made by means other than wire looms. For example a flexible film having conductive traces upon it might be used to make the connections. Although the preferred embodiment has two printed circuit boards defining a longitudinal flexing region of the screen it would also be possible to construct embodiments of the invention with other numbers of circuit boards.

While a preferred embodiment of the present invention has been described in detail herein, it should be clearly understood that many variations and/or modifications of the basic inventive concepts herein taught, which may appear to those skilled in the present art will still fall within the spirit and scope of the present invention as defined in the appended claims.

I claim:

1. An electrical display comprising:
   a flexible LCD screen having a plurality of column and row electrodes;
   a central spine region about which the flexible LCD screen folds, the central spine region being substantially parallel to the plurality of column electrodes;
   circuit boards each coupled to both the row and column electrodes, the circuit boards bounding therebetween the central spine region; and
   electrical conductors connecting each of the circuit boards to the plurality of column electrodes, wherein
   the electrical conductors are provided in the central spine region, and
   the electrical conductors connect to the circuit boards at sides of the circuit board demarcating the central spine region.

2. An electrical display as claimed in claim 1, wherein the electrical conductors are dimensioned to be slackened when the screen is in an unfolded condition to inhibit undue tension in the conductors when the screen is folded.

3. An electrical display as claimed in claim 1, wherein the electrical display comprises two circuit boards, and the two circuit boards are provided on each side of the central spine region.

4. An electrical display as claimed in claim 3, further comprising at least one driver circuit located on each circuit board, and which is configured to drive the display.

5. An electrical display as claimed in claim 1, wherein the electrical conductors form part of a wire loom.

6. An electrical display as claimed in claim 1, wherein the circuit boards substantially extend along a full length of the central spine region.

7. An electrical display as claimed in claim 1, wherein all of the electrical conductors are provided wholly within the central spine region.

* * * * *